Dec. 5, 1950 G. HECHT 2,532,718

COORDINATE SELECTING AND LOCKOUT CIRCUIT

Filed April 27, 1949 2 Sheets-Sheet 1

INVENTOR
G. HECHT
BY William F. Simpson
ATTORNEY

INVENTOR
G. HECHT
BY William F. Simpson
ATTORNEY

Patented Dec. 5, 1950 2,532,718

UNITED STATES PATENT OFFICE 2,532,718

COORDINATE SELECTING AND LOCKOUT CIRCUIT

George Hecht, Astoria, N. Y., assignor to Bell Telephone Laboratories, Incorporated, New York, N. Y., a corporation of New York Application April 27, 1949, Serial No. 90,001

6 Claims. (Cl. 315—323)

Figure 1:
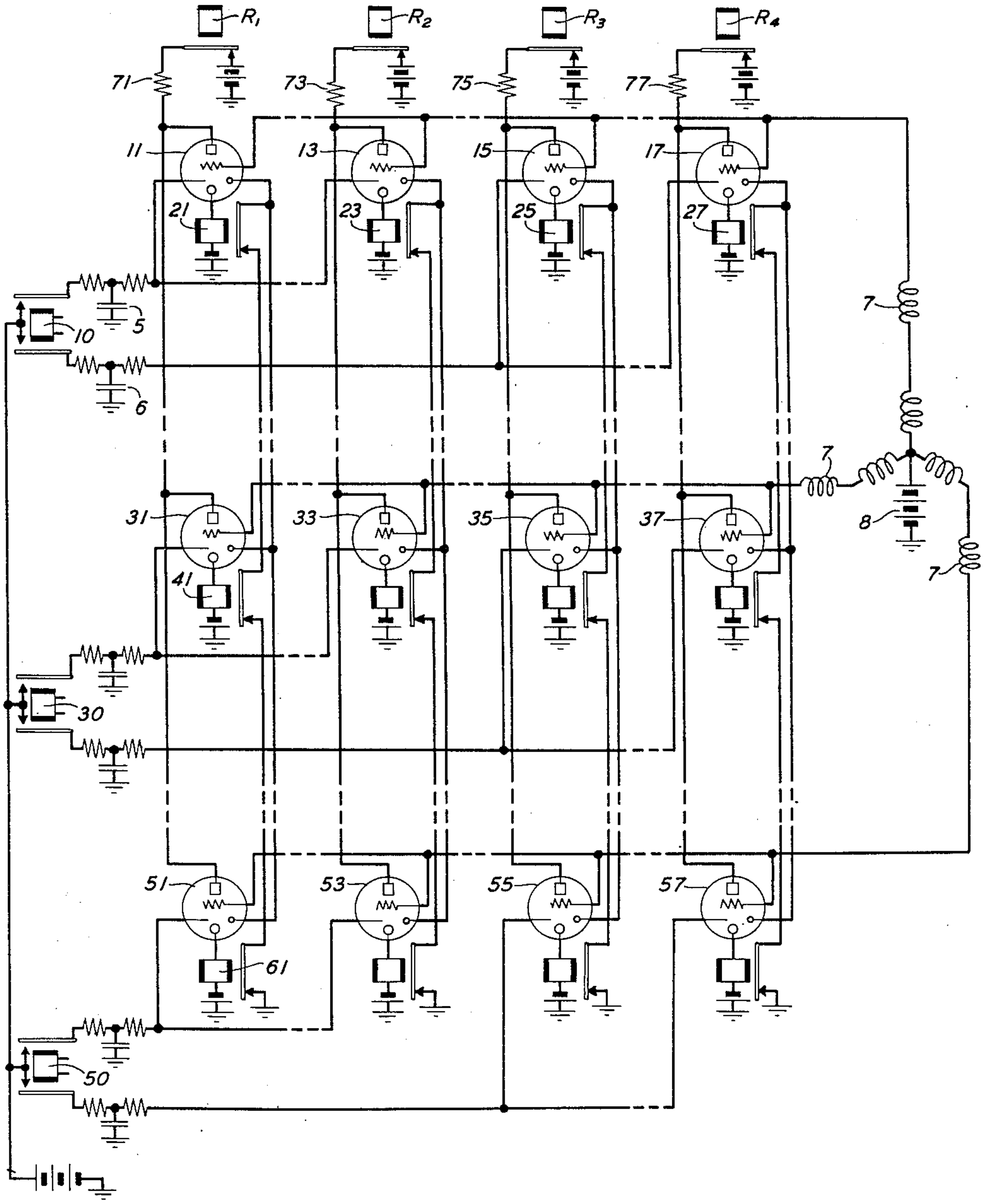

This invention relates to improved interconnecting, selecting, and lock-out control circuits for coordinate switching arrangements.

An object of the invention is to provide arrangements operating at high speed and with greater accuracy than heretofore, for interconnecting individually any one of a plurality of devices, circuits or paths to any one of another plurality of other devices, circuits or paths.

In arrangements of this type, any one or more of each of the first group of devices, circuits or paths may be simultaneously conditioned for connection with any one of the devices, circuits or paths of the second group. The second group of devices are normally not conditioned for connection, but any number of them may be individually and simultaneously or in succession conditioned for connection with one of the devices, circuits or paths of the first group. The present circuit arrangement is provided to permit an individual connection to be established from any one of the first group of devices to any one of the second group of devices in such a manner that no double connections occur even though the devices of both groups are simultaneously conditioned for connection with devices, circuits or paths of the other group.

In accordance with an exemplary embodiment of the invention, a plurality of cold cathode type gas-discharge tubes containing residual gas at low pressure are arranged in a plurality of lock-out arrays such that a discharge may be completely established in only one of the tubes of each array.

Each of the arrays of tubes connected in the lock-out circuit arrangements are energized successively from a different phase of alternating current source.

A feature of the invention relates to circuit arrangements for dividing the tubes into subgroups and in which the tubes in each of the subgroups are given different orders of preference over the tubes of other subgroups so that the traffic load may be more evenly distributed between the various devices of the various groups of devices to be interconnected.

After a connection is established between one of the devices, circuits or paths of the first group and one of the devices, circuits or paths of the second group, all of the tubes associated with both of these paths are rendered incapable of further operation or ionization so long as the two circuits are connected together. In the meantime other circuits may be established between other of the circuits of the various groups of circuits. In addition, two or more circuits may be established simultaneously between different ones of the devices, circuits or paths of the first group and different ones of the devices, circuits or paths of the second group without any device, circuit or path of either group becoming connected to more than one of the devices, circuits or paths of the other group.

In accordance with a specific embodiment of this invention, a plurality of multielement gas-discharge tubes are arranged in a coordinate array in which the tubes in each column are associated with one of the devices, circuits or paths of the first group and the tubes of each row are associated with one of the devices, circuits or paths of the second group. In order for a device of the first group to become connected to a device of the second group, a discharge must be initiated within and transferred to predetermined elements of one of the devices which is in the column of the first device being connected and the row of the device of the second group being connected. Upon the establishment of a discharge through any one device, all of the tubes of the row in which the discharging tube is located are disabled as well as all of the tubes in the column in which the discharging tube is located. These tubes will thereafter remain disabled so long as the connection between the two devices is maintained.

In accordance with a specific embodiment of this invention, a multielement gas-discharge tube is employed, having residual gas at low pressure, such as argon, neon, or other inert gases as well as other gases or vapors, or mixtures thereof. The tubes are provided with a control or discharge initiating gap or group of electrodes, one of which is called the cathode and the other the anode. In addition, a main discharge path is provided between the main anode and the main cathode. A shield screen or grid is interposed between the main anode and the main cathode in such a manner that a discharge must be initiated to the shield or screen before a discharge can be initiated to the main anode. Thus, upon the application of proper discharge initiating potentials to the elements of the control gap, a discharge is initiated across the control gap. Under suitable conditions, a discharge will then transfer from the control gap cathode to the shield or screen and then from the screen to the main anode. The discharge will then transfer from the control gap cathode to the main cathode thus completing the discharge across the main path in the tube. As will be described hereinafter, the circuits are arranged so that a discharge may be transferred between the main anode and the main cathode and only one of the tubes connected in the lock-out circuits at any given instant of time.

In the exemplary embodiment set forth herein, it is assumed that it is desired to establish connections at intervals between any one of a group of senders and any one of a group of markers. It is immaterial which sender becomes connected to a given marker at any given time but it is undesirable to have two senders connected to one marker or two markers connected to one sender. It is also desirable to permit as many different senders to be connected to a corresponding plurality of markers simultaneously or in rapid succession as are required or as are provided.

Figure 2:
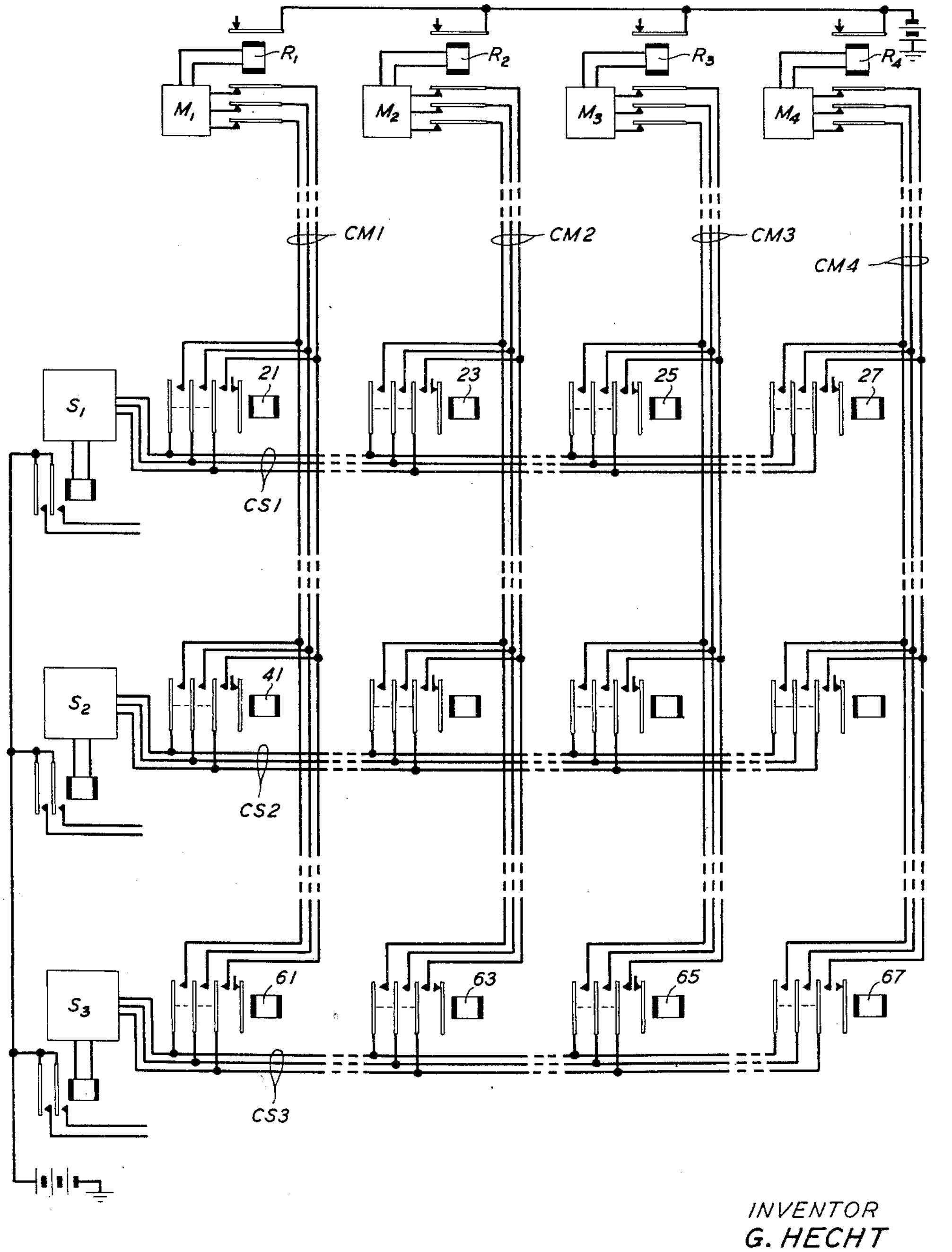

The interconnecting arrangements incorporating this invention and the mode of operation, cooperation, and interaction of the circuits and tubes thereof, may be readily understood from the following description when read with reference to the accompanying drawings in which:

Fig. 1 shows in detail the elements of exemplary groups of tubes in which the tubes of each group are connected in individual lock-out circuits and in which the groups are sequentially activated in accordance with an exemplary embodiment of the present invention; and Fig. 2 shows the manner in which the various senders are connected to the various markers in response to the operation of the tubes and relays shown in Fig. 1.

Referring first to Fig. 2, a group of markers are indicated by the rectangles M1, M2, M3 and M4. These markers control associated relays R1 through R4, inclusive, which relays are normally released when the markers are idle so that the upper break contacts of these relays are normally closed and connect battery through them to the circuits indicating that these markers are idle or available for selection. These break contacts are also illustrated in Fig. 1 as the contacts of relays R1 through R4, across the top of Fig. 1. Thus, these contacts are normally closed so the positive battery is normally applied to the main anodes of each of the tubes of the corresponding columns through the respective common resistors 71, 73, 75, 77, etc., when the corresponding marker is available for use by a sender or is being used by a sender to aid in the establishment of a telephone connection.

A group of senders S1, S2, S3 is also shown in Fig. 2, and each of these senders control a corresponding relay 10, 30 and 50. The relays 10, 30, 50 are normally released. When a sender desires to be connected to a marker to aid in the establishment of a connection through a dial telephone system, a corresponding relay 10, 30, or 50 will be operated which in turn applies voltage from battery B to two leads extending to the tubes of Fig. 1. The relays 10, 30 and 50 are shown both in Figs. 1 and 2.

As shown in Fig. 2, more markers are provided than senders. However, it is to be understood that any suitable number of markers or senders may be provided and in the usual telephone switching system many more senders are frequently provided than are markers because the sender holding time per call is much greater than the marker holding time per call. Consequently, more senders are required to handle a given volume of traffic.

In order for any one sender to be connected to any one marker it is essential that some one of the relays 21 through 71, 23 through 73, 25 through 75, will be operated. As shown in Fig. 2, these relays are arranged in a coordinate array and the senders connected to the groups of conductors or cables CS1, CS2, CS3, CS4 and CS5. Likewise, the markers are connected to the groups of conductors or cables CM1, CM2, CM3 and CM4. These groups of conductors or cables are represented in Fig. 2 by three lines or conductors. It is to be understood however that any suitable number of conductors will be included in each of these cables and that in the usual system these cables will comprise many more than three conductors. The operation of any one of the relays of the array will be connected to all of the conductors of one of the CS cables to the corresponding conductors of the CM cables. The windings of the corresponding relays are shown in Fig. 1 connected to the main cathodes of the corresponding selection tubes.

Assume now that sender S1 desires to employ a marker to aid in the establishment of a telephone connection. Typical examples of senders and markers so employed in telephone switching systems are described in greater detail in United States Patent 2,089,921 granted to Carpenter August 10, 1937 and in an application for United States Letters Patent Serial No. 57,394, filed August 29, 1948 by Busch, which patent and application are hereby made a part of the present application as fully included herein.

When the sender S1 needs the services of a marker, relay 10 will be operated by the sender and apply 100 volts through both operated contacts of relay 10 to the control gap anodes of all of the tubes of the first row of tubes in Fig. 1. This potential is supplied through delay networks 5 and 6 which, in the exemplary embodiment of the invention set forth herein, comprising resistances and condensers. The time constants of these two networks may be the same or they may be different. These time constants of these networks may also be varied under control of the traffic conditions through the switching arrangement shown in Fig. 1. Assume, for example, that the time constant of the network 5 is less than the time constant of the network 6. Consequently, the condenser of network 5 will become charged to the discharge initiating voltage for tubes 11 and 13 before the condenser of network 6 becomes so charged. As a result, tubes 11 and 13 will have a preference and will usually have a discharge initiated through them first. When desired, the time constant of the networks 5 and 6 may be controlled by the number of busy paths or by the number of idle paths or idle tubes in either the first or second group of tubes. As shown in Fig. 1 the tubes are divided into two groups. It is to be understood, of course, that the tubes of any row may be divided into any desired number of subgroups and that any desired number of tubes may be included in each of the subgroups.

Under some conditions a discharge may occur between the control gap elements of two tubes in the group 1, such as 11 and 13 or between two tubes in the group 2, such as 15 or 17, or, under some circumstances, a discharge may simultaneously occur between the control gap elements of one or more tubes of each of the groups. However, inasmuch as the control gap cathodes of all of the tubes are normally connected directly to ground in circuits which provide substantially no impedance individual to the various cathodes and inasmuch as the control gap anodes of each group in the first row are connected together in circuits having substantially no individual impedance while the networks 5 and 6 provide common impedance for the control anodes of each group, the probability of a discharge being initiated between the control elements in more than one tube in any subgroup is remote.

After a discharge has been initiated between the control gap elements of at least one of the tubes in the first row, it is essential that a discharge be next initiated between the control gap cathode and the screen or shield member which is connected to one of the phases of a polyphase alternating current system, which in the exemplary embodiment shown in Fig. 1, to be a three-phase system. When the alternating-current voltage of this phase approaches at positive peak value, a sufficiently positive voltage is applied to all of these grid or screen members through a common lock-out impedance such as the inductance 7.

The inductance 7 may be a separate inductance connected in series with each of the phases of the polyphase alternating-current supply voltage or this inductance may be included within the polyphase transformer supplying this voltage. In any event, the voltage from the battery 8, together with the alternating-current voltage from the one phase of the three-phase supply is sufficient when the alternating current is near its maximum positive value to cause a transfer of a discharge within one of the tubes to the screen grid member of that tube. At this time, however, the alternating-current voltage is applied to the screen grids of the tubes of the other rows, it is not near its maximum peak values and consequently, insufficient voltage is supplied to the screens of the tubes of these other rows so that another sender may be simultaneously seeking the marker. The tubes associated with this other sender will not have a discharge transferred within them from the control gap cathode to the screen or idle grid member thereof.

It should also be noted that as described hereinbefore, the control gap cathodes are all connected through this ground without any such impedance individual to the respective cathodes. Likewise, all of the shield or grid members of the first row of tubes are connected in a circuit having no individual impedance and extending through the common impedance 7 with the result that a discharge is permitted to transfer from the control cathode from the grid or shield member in all common tubes. Such lock-out circuits are described in greater detail in United States Patents 2,326,551 granted to Mohr on August 10, 1943 and 2,350,888 granted to Hall on June 6, 1944.

Assuming now that discharge is initiated between the control cathode and the screen or shield member of tube 11, the discharge will then transfer to the main anode of tube 11 and then to the main cathode of this tube. Consequently, a circuit is completed from positive battery through the break contacts of relay R1, resistor 71 and main anode of tube 11 to the main cathode of tube 11 and then to negative battery through the winding of relay 21 thus causing relay 21 to be operated. The operation of relay 21 interrupts the ground connection to the control gap cathodes of all of the tubes 11, 31, 51, etc., associated with the first marker M1. Consequently, so long as relay 21 remains operated, a discharge may not be again initiated through any of the tubes in this first column. Likewise, current flowing to the screen grid member of this tube flows through the impedance 7 which is sufficiently high so that the potential applied to the shield or screen grid of the other tubes of row 1 in Fig. 1, is insufficient to initiate a discharge between the control cathode and the screen of any of these tubes. Once a discharge is initiated through tube 11, for example, it should be noted that this discharge current will continue to flow from the positive battery through the break contacts of relay R1, resistor 71 and across the main gap of tube 11 to negative battery through winding of relay 21 independently of the existence or non-existence of other discharges between other elements of the tube. Consequently, relay 21 operates and remains operated until released by the marker operating relay R1 as will be described hereinafter.

If another sender has operated another one of the relays, such as relay 30, by the time another phase of the alternating current reaches it maximum value and a discharge has been initiated across the control gap of tube 31, but relay 21 has not as yet operated, this discharge may transfer to the screen grid of this tube but will not transfer to the main anode thereof, due to the voltage drop across resistor 71, caused by the current flow through tube 11 and the anode 21. Consequently, it is impossible to operate any of the other relays of the first vertical column at this time. When relay 21 operates, it interrupts the discharge path through the control gaps of all the tubes of the first column so these discharges are extinguished. Consequently, if sender S2 still requires a marker and has operated relay 30 a discharge will then be initiated across the control gap of some other tube of the second row and this discharge later transferred to the main gap of some other one of the tubes of this row in a manner similar to the manner described above.

The operation of relay 21 in addition to interrupting the circuit to the control gap cathodes of tubes 11, 31 and 51, also connects sender S1 to the marker M1 as shown in Fig. 2. As shown in Fig. 2, the relay 21 is employed to establish the connection between these two devices. It is to be understood however, that relay 21 which is operated by current flowing in the main anode-main cathode circuit of tube 11 may merely operate another relay which relay will in turn interconnect the sender S1 and the marker M1 in cases where a large number of leads must be interconnected. In this manner, the current requirement for tube 11 may be greatly reduced and a sensitive relay operated in its cathode circuit. This relay in turn would operate a much larger relay for interconnecting the necessary number of leads, as is well understood by persons skilled in the art.

These relays remain operated so long as it is necessary or desirable to connect the sender S1 with the marker M1. When sufficient information has been transmitted between these circuits, the usual practice is for the sender to indicate to the marker that it has received the necessary information whereupon the marker will disconnect itself by momentarily operating relay R1. The operation of relay R1 at this time removes the anode voltage from all the tubes 11, 31 and 51; thus causing any discharge through any of these tubes to be interrupted. Under the assumed conditions the discharge through tube 11 will be interrupted which in turn allows relay 21 to release and interrupt the connection between the sender S1 and the marker M1.

When the marker has restored to its normal condition relay R1 will release and reconnect the anode voltage to tubes 11, 31 and 51, thus conditioning these tubes for use by the same or other senders in establishing other connections through a switching system.

In case two or more senders attempt to simultaneously seize a marker they will operate their corresponding relays such as relay 30 and 50 for example, or 50 and 10, or other corresponding relays. All three of the senders may attempt to simultaneously seize the marker and three of the relays will be simultaneously operated. The operation of these relays simultaneously applies the discharge initiating voltages to the control gap anodes of all of the tubes and may permit discharges to be initiated across all those tubes not associated with busy marker circuits. However, the discharge will be transferred to the screen in only one of the tubes in a manner described above. The transfer voltage is applied to the screen of all the tubes in each row in succession by means of the individual phases of the polyphase alternating current supply. Thus a discharge will transfer to the screen or shield of one tube of one row at any instant of time. Assume for example, that the discharge transfers in tube 33 in the second row first. This discharge will then transfer to the main anode and then the main cathode in the manner described above and connect sender S2 to marker M2. The discharge and transferring of the discharge to the screen or shield in tube 33 prevents a similar discharge to transfer in any of the other tubes of the second row. Assume next that the discharge will transfer to the screen or shield in tube 51, which discharge then transfers across the main gap of this tube and causes the sender S1 to be connected to marker M1. In a similar manner where senders require connection to the markers, discharges are initiated and transferred in each of the succeeding rows providing that marker is not busy, in the manner described above and cause the interconnection of the sender with a marker. The next time the screens or shield in second row become energized from the polyphase alternating-current source, the discharge flowing between the main cathode and main anode will cause current to also flow to the shield or screen in this tube and thus lower the voltage of all of the other shields or screens and no further discharge can be transferred in any of the other tubes of this row. When the relay or relays controlled by the cathode circuits of any column of tubes operates discharges through the control gap of all the tubes of that column are interrupted and further discharges prevented until the operated relay is released. In this manner, the various senders may be connected to the different ones of the markers depending upon the busy or idle condition of the various markers as well as the minor differences in the characteristics of the various tubes employed. However, due to the operation of the lock-out circuits as described above no sender becomes connected to two markers and two senders do not become connected to the same marker at any one instant of time.

As pointed out hereinbefore, each row of tubes is divided into two groups. It is to be understood that any suitable number of groups may be provided in any row and that any number of tubes may be included in any of the groups of a row. Furthermore the number of busy circuits in any group may be employed to change the time constants of the delay network such as the delay networks 5 and 6 associated with the first row of the tubes. Alternatively the time constants of these delay networks may be altered on each successive call; thus alternating the groups of circuits given preference on each call. Typical examples of the manner in which the time constants of such delay networks are varied is disclosed in the United States patent application of Bruce et al., Serial No. 782,704, filed October 29, 1947.

The foregoing description of an exemplary embodiment of the invention merely illustrates one typical arrangement employing multiple lock-out circuits in accordance with this invention. It is to be understood that there are many modifications and other arrangements adapting the invention for use with other systems and circuits, which modifications and arrangements do not depart from the spirit and scope of the invention.

What is claimed is:

1. In combination, a plurality of gaseous conduction tubes arranged in groups, means for applying discharge initiating potentials to groups of said tubes in rotation, parallel connections between a corresponding electrode of a tube in each of said groups and a common lock-out impedance element to permit a discharge to be established between predetermined elements in only one tube of a group at a time, and circuit means controlled by the establishment of a discharge between said predetermined elements of said tubes.

2. In a coordinate switching arrangement a first group of circuits, a second group of circuits, apparatus for selectively connecting one of said first groups of circuits to any one of said second group of circuits comprising a plurality of cold cathode gas-discharge tubes arranged in a coordinate array in which the tubes of each row are associated with an individual circuit of one group and in which the tubes of each column are associated with and individual to a circuit of the other group, apparatus for applying in succession discharge initiating potentials to the groups of tubes individual to the circuits of one of said groups, and common lock-out impedance means individual to the tubes associated with the other groups of circuits for preventing the simultaneous discharge between predetermined elements of more than one of the tubes associated with the other group of circuits.

3. In a coordinate switching arrangement, a plurality of gas-discharge tubes arranged in groups, common lock-out inductor connected to the tubes in each group for preventing the simultaneous discharge between predetermined elements of more than one of the tubes of each of said groups, a source of polyphase alternating current, and connections from said source of polyphase alternating current for energizing the tubes of each group in succession.

4. In combination, a first group of circuits, a second group of circuits, interconnecting circuits comprising a plurality of cold cathode gas conduction tubes arranged in groups, a common impedance element connected to the tubes in each group for preventing the simultaneous discharge between predetermined elements of more than one of the tubes of each of said groups, and other circuit connections for energizing the tubes of the different groups in succession, switching devices responsive to a discharge between predetermined elements of said tubes for establishing individual connections from a circuit of said first group to a predetermined circuit of said second group.

5. In combination, a plurality of multi-electrode electron discharge devices arranged in groups, circuit connections for applying energizing voltage to predetermined electrodes of the tubes of each of said groups in rotation, a common impedance element individual to each of said groups of tubes connected to one of the elements of the tubes of the associated group for preventing the simultaneous discharges between predetermined elements of more than one of the tubes of each of said groups, means for applying discharge initiating voltages to elements of the tubes of at least one of said groups and delay means for delaying the application of said discharge initiating voltage to certain of said tube elements, and circuit means controlled by the establishment of a discharge between predetermined elements of one of said tubes.

6. In a coordinate switching arrangement a first group of circuits, a second group of circuits, apparatus for selectively connecting one of said first groups of circuits to any one of said second group of circuits comprising a plurality of electron discharge devices arranged in a coordinate array in which the devices in each row are associated with an individual circuit of one of said groups of circuits and in which the tubes of each column are associated with and individual to a circuit of said second group, apparatus for energizing in succession the groups of tubes individual to the circuits of one of said groups of circuits, and common impedance means for preventing the simultaneous discharge between predetermined elements of more than one of the tubes associated with the circuits of the other group of circuits, and traffic equalizing means for rendering certain of said tubes conducting in preference to others of said tubes.

GEORGE HECHT.

REFERENCES CITED

The following references are of record in the file of this patent:

UNITED STATES PATENTS

| Number | Name | Date |
| --- | --- | --- |
| 2,099,065 | Holden | Nov. 16, 1937 |
| 2,146,862 | Shumard | Feb. 14, 1939 |
| 2,308,778 | Prince, Jr. | Jan. 19, 1943 |
| 2,317,471 | Meacham | Apr. 27, 1943 |
| 2,398,771 | Compton | Apr. 23, 1946 |
| 2,411,441 | Leroy et al. | Nov. 19, 1946 |
| 2,438,492 | Bascom et al. | Mar. 30, 1948 |